(12) United States Patent
Hand et al.

(10) Patent No.: US 7,988,181 B2
(45) Date of Patent: Aug. 2, 2011

(54) WORK PLACE AND STORAGE APPARATUS

(76) Inventors: William Hand, Pleasanton, CA (US); Robert Howe, Danville, CA (US)

( * ) Notice: Subject to any disclaimer, the term of this patent is extended or adjusted under 35 U.S.C. 154(b) by 177 days.

(21) Appl. No.: 12/457,068

(22) Filed: Jun. 1, 2009

(65) Prior Publication Data
US 2010/0194063 A1 Aug. 5, 2010

Related U.S. Application Data

(63) Continuation-in-part of application No. 11/907,845, filed on Oct. 18, 2007, now Pat. No. 7,562,898.

(51) Int. Cl.
*B62B 1/18* (2006.01)
(52) U.S. Cl. .......... 280/653; 280/47.18; 280/47.31; 298/3
(58) Field of Classification Search ........ 298/2, 3, 298/17 B, 17 S, 17 SG, 17 T, 17 R; 280/653, 280/654, 47.18, 47.31, 760, 47.12, 47.17, 280/47.32
See application file for complete search history.

(56) References Cited

U.S. PATENT DOCUMENTS

| | | | |
|---|---|---|---|
| 832,628 | A | 10/1906 | Schreffler |
| 1,769,271 | A | 7/1930 | Parsons |
| 5,085,447 | A | 2/1992 | Audibert |
| D338,306 | S | 8/1993 | White et al. |
| 5,642,898 | A | 7/1997 | Wise |
| 5,687,979 | A * | 11/1997 | Plevka |
| 5,893,572 | A | 4/1999 | Parks |
| 6,053,587 | A | 4/2000 | Boerder |
| 6,193,265 | B1 | 2/2001 | Yemini |
| 6,935,641 | B2 | 8/2005 | Hahn |
| 7,032,921 | B2 | 4/2006 | Swanner |
| 7,562,898 | B2 * | 7/2009 | Hand et al. |
| 2002/0144935 | A1 | 10/2002 | Tims |
| 2005/0212238 | A1 | 9/2005 | Conley |
| 2006/0157944 | A1 | 7/2006 | Alexander |
| 2007/0063466 | A1 | 3/2007 | Tiramani et al. |

FOREIGN PATENT DOCUMENTS

| | | |
|---|---|---|
| GB | 2179305 | 3/1987 |
| GB | 2293757 | 4/1996 |
| GB | 2311965 | 10/1997 |

* cited by examiner

*Primary Examiner* — Stephen Gordon
(74) *Attorney, Agent, or Firm* — Theodore J. Bielen, Jr.

(57) ABSTRACT

A storage and work place apparatus used in conjunction with a wheelbarrow or similar item. The apparatus includes a housing having a bottom portion and a side portion extending outwardly to form an open chamber the bottom portion is intended to a lie atop a wheelbarrow a cover is used in conjunction with the open chamber and is hingedly or slidingly attached to the housing in order to extend laterally from the housing. At least a first leg attainably connects to the housing and extends outwardly to contact a ground surface adjacent the wheel barrow. At least a second leg is rotatable attached to the cover and also extends outwardly therefrom to support the cover above the ground surface when the leg contacts the ground surface.

13 Claims, 5 Drawing Sheets

WORK PLACE AND STORAGE APPARATUS

CROSS-REFERENCES TO RELATED APPLICATIONS

The present application is a continuation-in-part of U.S. patent application Ser. No. 11/907,845, filed 18 Oct. 2007, and now issued as U.S. Pat. No. 7,562,898.

BACKGROUND OF THE INVENTION

The present invention relates to a novel and useful work place and storage apparatus.

Tools, machines, materials, and the like necessarily be transported from a storage area to a place of work. In the past, tool chest has been used to maintain such implements at hand during construction and manufacturing task. In addition, such tool chest have been mobilized by the addition of casters or wheels. However, tool chest and storage bins for tools and the like are necessarily bulky and difficult to move despite the fact that wheels have been attached. For example, tool chest are not easily moved over uneven terrain surfaces and along serpentine courses.

In the past, devices have been improvised to carry or transport tools and the like. U.S. Pat. Nos. 5,085,447 7,032,921 US Patent Publication 2006/0157944, United States Patent Application Publication 20070063466, and Uk Patent Application 2,293,757 describe portable table structure for transporting equipment and tools which are generally compact or collapsible in nature.

U.S. Pat. No. 832,628, U.S. Design Pat. 338,306, and UK Patent Application 2,31965 describe carts having containers that are movable and may be used to transport tools and equipment.

U.S. Pat. Nos. 5,642,898, 5,893,572, 6,053,587, and 6,935,641 show portable tool carts which include benches or tables to allow a work place for the user.

U.S. Pat. No. 6,193,265 and UK Patent Application 2179305 show wheel barrow structures possessing novel attachment such as handles and legs.

U.S. Pat. No. 1,769,271 and US Patent Application Publications 2002/0144935, 2005/0212238 describe wheel barrow attachments in the form of platforms and bins which may be used to support items and process materials.

A storage and work place apparatus useable with a wheelbarrow or similar item would be a notable advanced in the manufacturing and construction arts.

BRIEF SUMMARY OF THE INVENTION

A storage and work place apparatus used in conjunction with a wheelbarrow or similar item is hereinbelow provided.

The apparatus of the present invention utilizes a housing having a bottom portion and a side portion extending outwardly from the bottom portion to form an open chamber. The bottom portion of the housing lies atop a wheelbarrow and may be temporally or permanently fixed thereto. The bottom of the housing may also include a projection which extends downwardly into the receptacle portion of the wheelbarrow in addition, a container may be utilized with the projection such that the container extends below the housing and into the wheel barrow receptacle. The container may be adjustably oriented with respect to the container in order to conform to the contours of the wheel-barrow receptacle portion.

A cover is also employed with the present apparatus to overlie the open chamber of the housing. The cover is slidingly or hingedly attached to the housing for extension laterally from the housing in a rotatable manner. The cover may be formed with a flat under surface which becomes a free work place surface when such extension takes place.

At least a first leg and, preferably, a cortex of legs are rotatably attached to the housing. For example, such cortex of legs may be rotatably attached to the bottom portion of the housing such that such extension may take place downwardly from the housing when it is poised atop a wheel barrow. The cortex of legs would be able to reach the ground surface upon which the wheel barrow is to be moved. Each of the legs of the cortex of the legs may be adjustable and length to accommodate the particular height of the wheelbarrow with which the apparatus of the present invention is to be used. In addition, at least a second leg and, preferably a pair of legs is rotatable attached to the cover. Thus, when the cover is rotated outwardly from the housing, the pair of legs will support the cover such that the flat under surface is assessable to the user for a work place.

It may be apparent that a novel and useful storage and work place apparatus use in conjunction with a wheel barrow has been hereinabove described.

It is therefore an object of the present invention to provide a storage and work place apparatus which facilitates the transportation of tools and the like to and from a job site.

Another object of the present invention is to provide a storage and work place apparatus which is capable of moving large and heavy tool chest to and from a work site by the use of a conventional wheel barrow.

Another object of the present invention is to provide a storage and work place apparatus which securely stores a tool chest and protects the same from the elements.

A further object of the present invention is to provide a storage and work place apparatus use in conjunction with a wheelbarrow that saves time and money during construction and manufacturing activities.

Yet another object of the present invention is to provide a storage and work place apparatus which utilizes the storage capacity of a wheelbarrow and creates a work surface which forms part of mobile unit.

A further object of the present invention is to provide a storage and work place apparatus which is easily retrofitted to existing wheel barrows which are employed to provide mobility.

The invention possesses other objects and advantages especially as concerns particular characteristics and features thereof which will become apparent as the specification continues.

Figure 1:
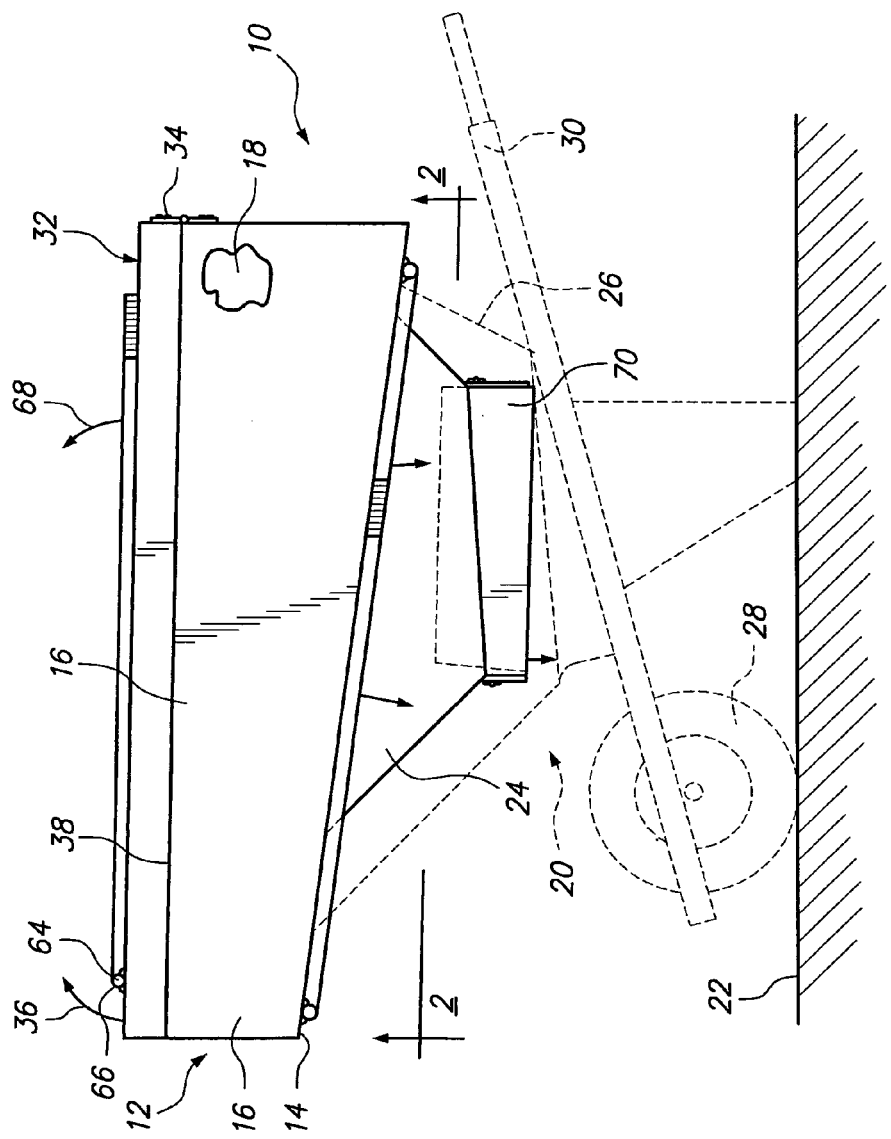
FIG. 1 is a side elevational view of the apparatus of the present invention used in conjunction with a wheelbarrow that is depicted in phantom.
Figure 2:
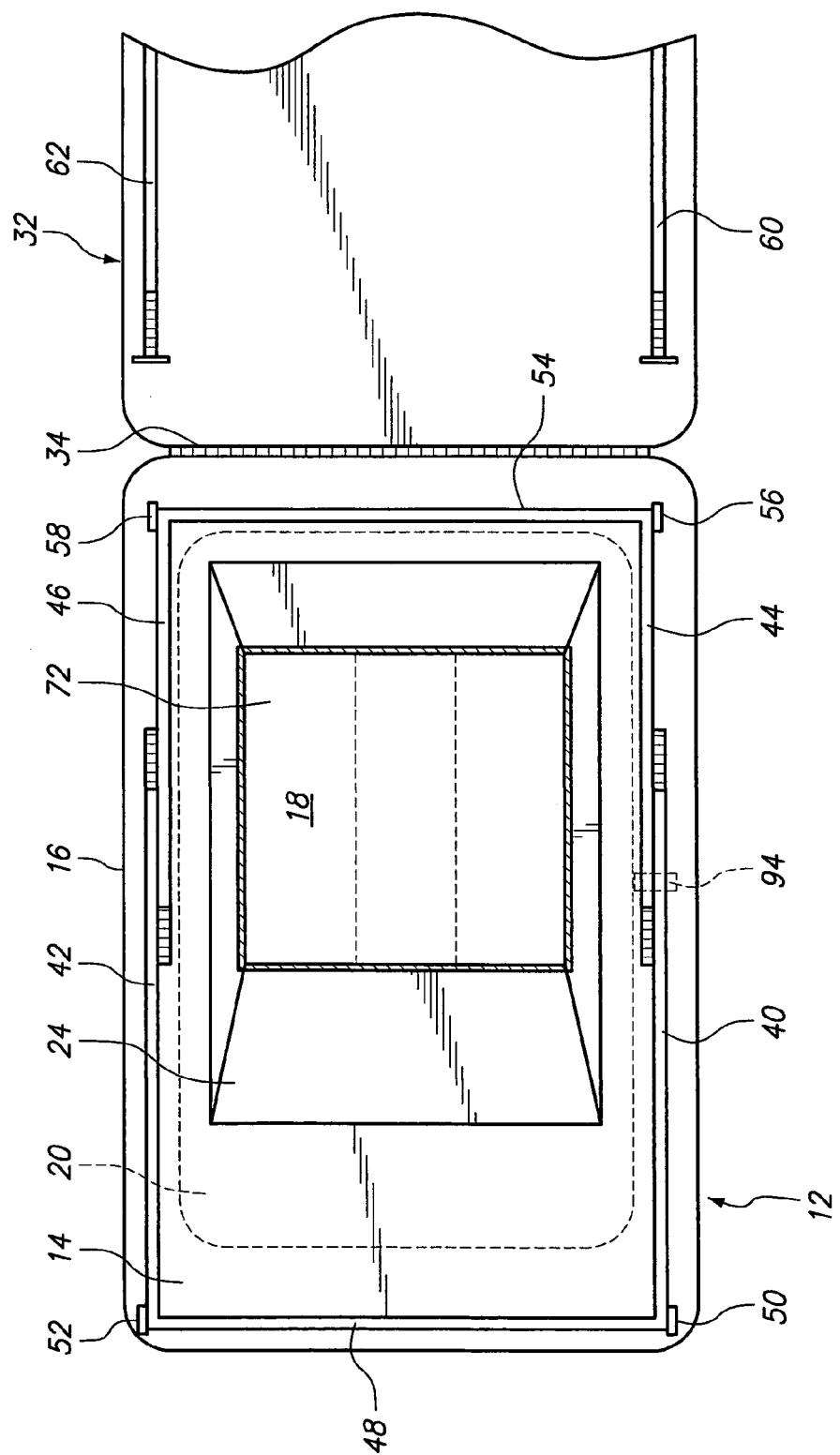
FIG. 2 is a sectional view taken along line 2-2 of FIG. 1.

For a better understanding of the invention reference is made to the following detailed description of the preferred embodiments of the invention which should be taken in conjunction with the above described drawings.

DETAILED DESCRIPTION OF THE PREFERRED EMBODIMENTS OF THE INVENTION

Various aspects of the present invention will evolve from the following detailed description of the preferred embodiments thereof which should be referenced to the prior described drawings.

A preferred embodiment of the invention as a whole is shown in the drawings by reference character 10 with various embodiments distinguished by upper case letters. Apparatus 10A, FIGS. 1-4, includes as one of its elements a housing 12 which may be constructed of any suitable rigid or Semi-rigid material. Housing 12 includes a bottom 14 and a side portion 16 extending therefrom to form an open chamber 18. Housing 12 is intended to lie above and atop a wheelbarrow 20, FIGS. 1, 3, and 4, and may be attached by any suitable fastening systems, such as nuts and bolts, clamps, welding, and the like. Housing 12 is also formed with a projection 24 which extends from bottom 14. Projection 24 is intended to extend into the receptacle or load carrying portion 26 of wheelbarrow 20. Wheel barrow 20 also includes a wheel 28 which moves across ground surface 22 handle part 30 is used to maneuver wheelbarrow 20 in the convictional manner.

Apparatus 10A is also provided with a cover 32 which encloses open chamber 18 of housing 12 and is hingedly attached to container 12 by hinge 34 to permit the movement of cover 32 according to directional arrow 36, FIG. 1. That is to say, cover 32 extends laterally from housing 12 by this movement which is clearly shown in FIG. 4 and will be discussed hereinafter. Moreover, cover 32 is provided with a flattened surface 38 which becomes assessable upon the extension of cover 32 from housing 12.

Figure 4:
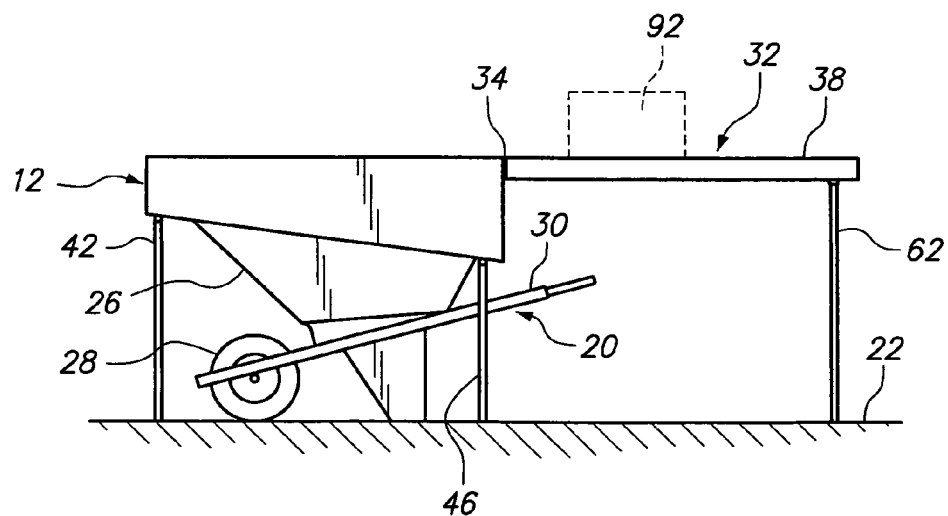
FIG. 4 is a schematic view of the apparatus of the present invention and its open configuration for use as storage in work place item.

Housing 12 is fitted with legs 40, 42, 44, and 46. Legs 40 and 42 are connected to one another by a spanning bar 48 which is rotatably attached to housing 12 via pivot 50 and 52. Likewise, legs 44 and 46 are connected to a spanning bar 54 and rotates about pivots 56 and 58. It should be noted that legs 40, 42, 44, and 46, extend outwardly from housing 12 and lie adjacent wheel barrow 20 as depicted in FIG. 4. Thus, legs 40, 42, 44,and 46 hold housing 12 and wheelbarrow 20 in an upright position such that chamber 18 is assessable within housing 12.

In addition, legs 60 and 62 are rotatably attached to cover 32. It should be apparent that legs 60 and 62 are connected to one another via a spanning bar 64 and rotate about pivot 66 and another not shown which are identical to the arrangement with the respect to pivots 50 and 52, as well as pivots 56 and 58, with respect to housing 12. Again, legs 60 and 62 extend outwardly from cover 12 according to directional arrow 68, FIG. 1, and contact ground surface 22 to provide leveling for flatten surface 38 which may be used as a work place. It should be realized that legs 40, 42, 44, 46, 60 and 62 may be constructed to adjust in length.

Figure 3:
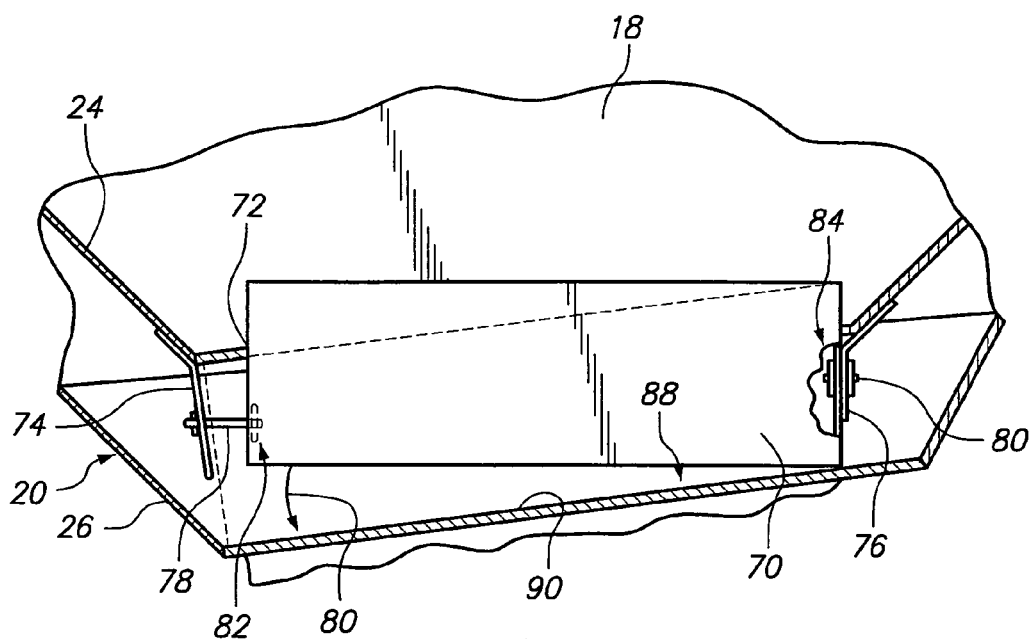
FIG. 3 is a partial sectional view of the projection portion of the apparatus and the wheelbarrow with the adjustable container depicted in whole.

Referring now to FIG. 3, it may be observed that apparatus 10A may also include a container 70 which lies at the lower most portion of projection 24 that is roughly in the shape of a truncated pyramid. Container 70 is position in opening 72 and may move downwardly therefrom by the use of slotted brackets 74 and 76. Brackets 74 and 76 are welded or otherwise fixed to projection 24 and extend downwardly to accept bolts 78 and 80 which are connected to container 70 by the use of nuts 82 and 84. Nuts 82 and 84 may be of any suitable configuration such as hexagonal nuts, wing nuts, and the like. In any case, container 70 slides downwardly as shown in FIG. 3 according to directional arrows 86 and 88 and is intended to a lie atop the base 90 of receptacle or load bearing portion 26 of wheelbarrow 20 container 70 may be of an open or closed configuration and be employed to confine smaller tools and the like, at the predilection of the user of apparatus 10A.

Figure 5:
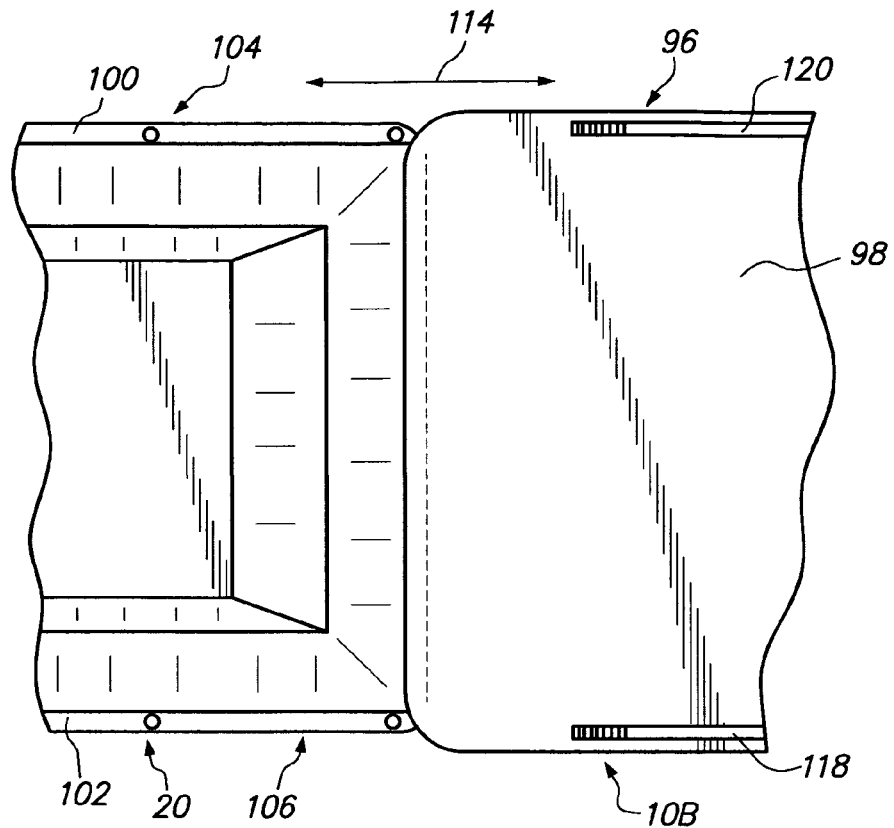
FIG. 5 is a partial top plan view of another embodiment of the present application.
Figure 6:
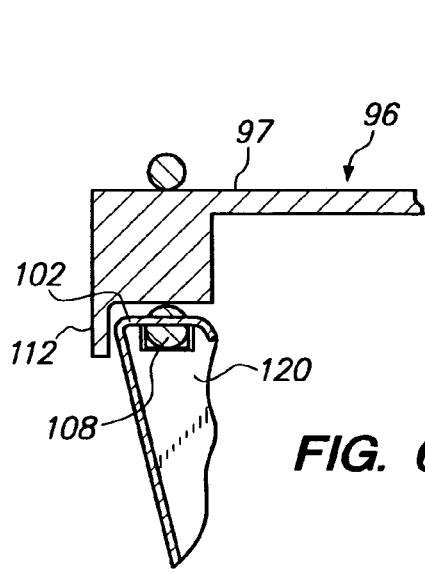
FIG. 6 is a sectional view of a corner of the sliding cover and a portion of the supporting wheelbarrow of the embodiment of FIG. 5.
Figure 7:
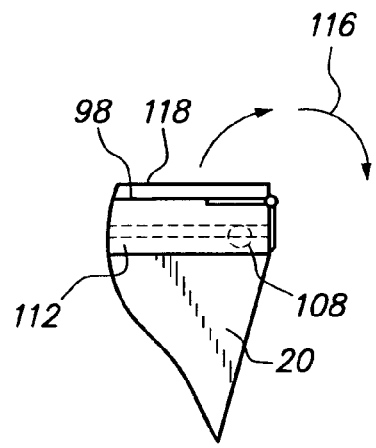
FIG. 7 is a partial side elevational view of the sliding top and a portion of a supporting wheelbarrow showing the rotational movement of supporting legs of the embodiment of FIG. 5.

Referring now to FIGS. 5-7, it may be observed that another embodiment 10B of the present invention is revealed. Embodiment 10B includes a cover 96 having an upper surface 98. Cover 98 is used with wheelbarrow 20. Wheelbarrow 20 further includes shelves or lips 102 which extend across the same. Lips 102 are provided with a plurality of ball bearings 104 and 106, respectively. Referring now to FIGS. 6, it may be observed that a ball bearing 108 slidingly contacts undersurface 110 of cover 96. A similar arrangement takes place with respect to plurality to ball bearings 104 used in conjunction with lip 100, FIG. 5. Flange 112 overlaps the upper portion of wheelbarrow 20 to guide cover 126 over wheelbarrow 26, directional arrow 114, FIG. 5. Needless to say, a similar flange to the structure of flange 112 also depends from cover 96 adjacent to lip 100.

Referring now to FIG. 7, it may be seen that leg 118 is depicted as rotating outwardly, directional arrow 116 and downwardly from cover 96 to contact ground surface 22 (not shown), similar to the configuration depicted in FIG. 4 with respect to embodiment 10A. Such extension of leg 118 in leg 120, FIG. 5, occurs when cover 96 has been extended outwardly from wheelbarrow 20 as shown in FIG. 5. Again, upper surface 98 of cover 96 provides a work area for the user of apparatus 10B.

Figure 8:
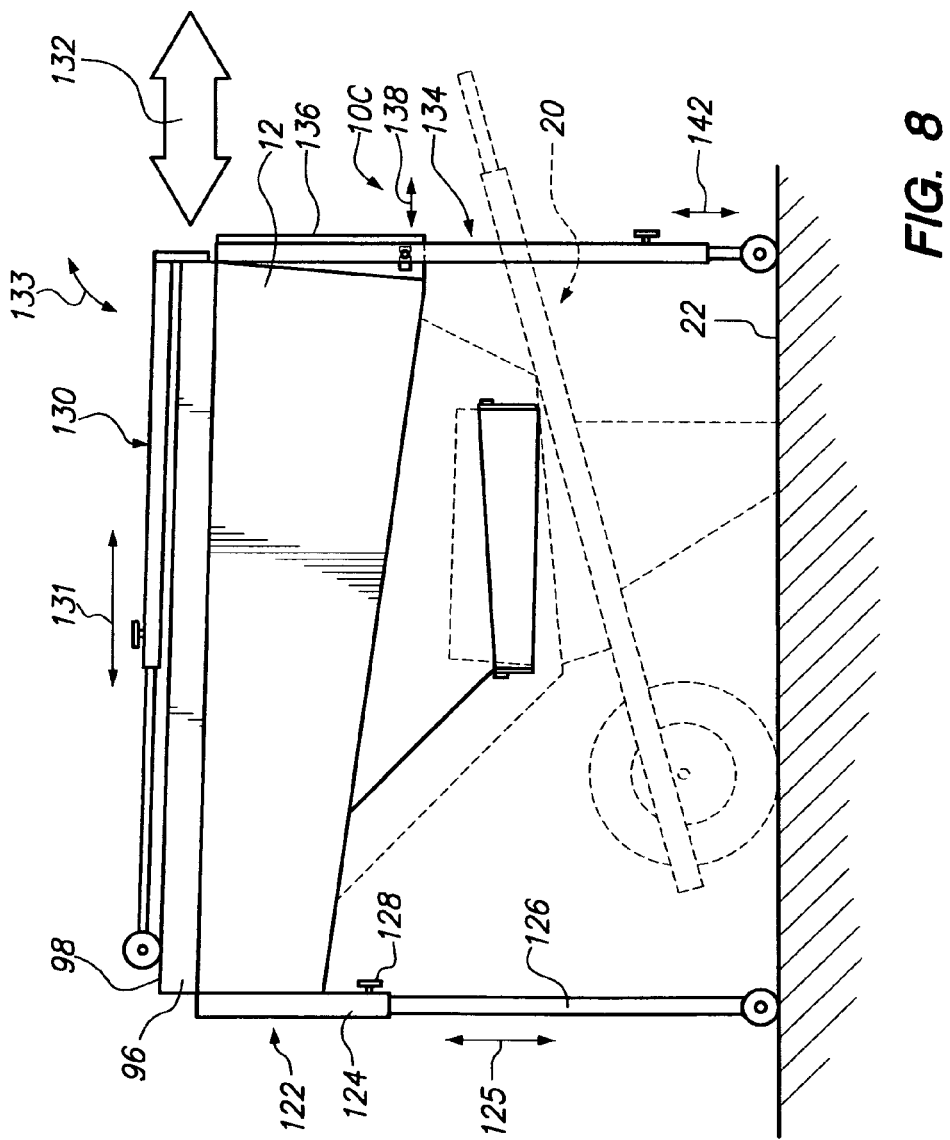
FIG. 8 is a side elevational view of yet another embodiment of the present invention.

Looking now at FIG. 8, embodiment 10C of the present invention is depicted. Apparatus 10C is used in conjunction with housing 12, wheelbarrow 20, and supporting surface 22. Pair of legs 122, (one not shown), are fixed to housing 12 by any suitable means such as welding, bolting, gluing, and the like. Each leg of pair of legs 122 is telescopically adjustable, directional arrow 125, having a large section 124 and a small section 126 which fits into large section 124. Threaded handle 128 holds small section 126 relative to large section 124 in order to allow embodiment 10C to rest on ground surface 22 in a relatively level condition. Pair of legs 130, (one not shown), lie atop of cover 96 and rotatably move into contact with ground surface 22, directional arrow 131, when sliding cover 96 is extended according to directional arrow 132. Again, each leg of pair of legs 130 is adjustable, directional arrow 131, in a manner similar to each leg of pair of legs 122. Likewise, one leg of pair of legs 134, (one not shown), attaches to a plate 136 fixed to housing 12 and, slightly, rotates according to directional arrow 138 within a slot 140 of plate 136. The other leg of pair of legs 134 operates in a similar manner. Such rotation permits each leg of pair of legs 134 to properly contact ground surface 22 to support cover 96 evenly relative to surface 22 when it is extended from housing 12. Again, each leg of pair of legs 134 adjusts lengthwise in a manner similar to legs 122, directional arrow 142.

In operation, the user places apparatus 10A or 10B in its closed configuration, FIG. 1, atop wheelbarrow 20. In certain cases, apparatus 10 may be fixed to wheelbarrow 10 by the use of brackets, straps, or other fasteners (not shown). Wheelbarrow 20 is then moved by grasping handle 30 and rolled along ground surface 22 to the desired place of use of apparatus 10A, 10B or 10C. Needless to say, housing 12 may be filled with tools, materials, and other items typical used in a construction or any manufacturing work place in which the transportation of these items to and from a site of secure storage is required. When wheelbarrow 20 is stopped, cover 32 of embodiment 10A is rotatably extended from container 12 and legs 62 and 64 are rotatably moved into the position shown in FIG. 4, to support flattened surface 38 in a roughly horizontal position. Cover 96, of embodiments 10B and 10C, is slidingly extended from wheelbarrow 20. With respect to embodiment 10B, legs 118 and 120 may rotate into contact with ground surface 22. Legs 40, 42, 44, and 46 of container 12 are also extended to contact ground surface 22 to lend stability and support to container 12 as well as wheelbarrow 20, and to maintain the same in the position shown in FIG. 4, allowing ready access to items in open chamber 18. Of course, pairs of legs 122, 130, and 134 are also extended from embodiment 10C when cover 96 has been extended from wheelbarrow 20 and housing 12. Pairs of legs 122 and 134 extend telescopically, directional arrows 125 and 142, respectively. Pairs of legs 130 rotate outwardly from cover 96 directional arrow 133, and adjust telescopically, directional arrow 131. Surface 38 of embodiment 10A or surfaces 98 of embodiments 10B and 10C may be employed to support tools or materials, or may be used as a working surface to manipulate and configure construction and manufacturing items. Bulk container 92, FIG. 4, is illustrated to show such support afforded by cover 32. Following use of apparatuses 10A, 10B or 10C in this manner, cover 32 of apparatus 10A is again folded back into the position shown in FIG. 1. Covers 96 of apparatuses 10B and 10C are slid back over wheelbarrow 20 in a similar manner. Legs of embodiment 10B, 40, 42, 44, 46, 60, and 62 are folded upwardly into the configuration depicted in FIG. 1 also. Pair of legs 130 of embodiment 10C is also folded upwardly in a similar manner. Legs 122 and 134 are retracted according to directional arrows 125 and 142, respectively. Clips or straps such as strap 94, FIG. 2, may be used to hold any legs in place while apparatus 10A, 10B or 10C lies in the configuration depicted in FIG. 1. Apparatus 10A, 10B or 10C is then wheeled into a storage area or other secure other place to ready the same for use in the future.

While in the foregoing, embodiments of the present invention have been set forth in considerable detail for the purposes of making a complete disclosure of the invention, it may be apparent to those of skill in the art that numerous changes may be made in such detail without departing from the spirit and principles of the invention.

What is claimed is:

1. A storage and workplace apparatus used in conjunction with a wheelbarrow having a receptacle and being movable along a ground surface comprising:
   a. a housing having a bottom portion and a side portion extending outwardly to form an open chamber, said bottom portion lying atop the wheelbarrow;
   b. a cover for said open chamber, said cover slidingly engaging to said housing for extending laterally from said housing;
   c. at least a first leg and a second leg being rotatably connected to said housing to extend outwardly from said housing adjacent the wheelbarrow and into contact with the ground surface; and
   d. at least a third leg rotatably attached to said cover to extend outwardly therefrom adjacent the wheelbarrow and into contact with the ground surface.

2. The apparatus of claim 1 in which said bottom portion of said housing includes a projection, said projection extending into the receptacle of the wheelbarrow.

3. The apparatus of claim 1 in which said at least a first leg comprises one pair of legs each leg of said one pair of legs being connected to said housing for extending outwardly therefrom.

4. The apparatus of claim 3 in which said at least a second leg further comprises another pair of legs each of said another pair of legs being connected to said housing for extending outwardly therefrom.

5. The apparatus of claim 4 in which said at least a third leg comprises yet another pair of legs, each of said yet another pair of legs being connected to said cover for extending outwardly therefrom.

6. The apparatus of claim 1 in which said cover further comprises a flattened surface which becomes accessible upon said cover extending laterally from said housing.

7. The apparatus of claim 6 in which said at least a first leg comprises one pair of legs, each leg of said one pair of legs being rotatably connected to said housing for extending outwardly therefrom.

8. The apparatus of claim 7 in which said at least a second leg further comprises another pair of legs each of said another pair of legs being rotatably connected to said housing for extending outwardly therefrom.

9. The apparatus of claim 8 in which said at least a third leg comprises yet another pair of legs, each of said yet another pair of legs being rotatably connected to said cover for extending outwardly therefrom.

10. The apparatus of claim 2 which further comprises a container, said container being connected to and being adjustably movable with respect to said projection for permitting the resting said container on the receptacle of the wheelbarrow.

11. The apparatus of claim 10 in which said at least a first leg comprises one pair of legs each leg of said one pair of legs being rotatably connected to said housing for extending outwardly therefrom.

12. The apparatus of claim 11 in which said at least a second leg further comprises another pair of legs each of said another pair of legs being rotatably connected to said housing for extending outwardly therefrom.

13. The apparatus of claim 12 in which said at least a third leg comprises yet another pair of legs, each of said yet another pair of legs being rotatably connected to said cover for extending outwardly therefrom.

* * * * *